(12) United States Patent
Deng

(10) Patent No.: US 9,945,536 B2
(45) Date of Patent: Apr. 17, 2018

(54) LIGHT GUIDE AND LED LAMP WITH THE LIGHT GUIDE

(71) Applicant: Jinhong Deng, Dongguan (CN)

(72) Inventor: Jinhong Deng, Dongguan (CN)

( * ) Notice: Subject to any disclaimer, the term of this patent is extended or adjusted under 35 U.S.C. 154(b) by 283 days.

(21) Appl. No.: 14/838,436

(22) Filed: Aug. 28, 2015

(65) Prior Publication Data

US 2017/0038029 A1  Feb. 9, 2017

(30) Foreign Application Priority Data

Aug. 6, 2015  (CN) .................... 2015 2 0588274 U

(51) Int. Cl.
| | |
|---|---|
| *F21V 7/10* | (2006.01) |
| *F21V 7/00* | (2006.01) |
| *F21V 7/05* | (2006.01) |
| *G02B 6/00* | (2006.01) |
| *F21K 9/61* | (2016.01) |
| *F21K 9/232* | (2016.01) |
| *F21Y 101/00* | (2016.01) |

(52) U.S. Cl.
CPC ................ *F21V 7/10* (2013.01); *F21K 9/232* (2016.08); *F21K 9/61* (2016.08); *F21V 7/0025* (2013.01); *F21V 7/05* (2013.01); *G02B 6/00* (2013.01); *F21Y 2101/00* (2013.01)

(58) Field of Classification Search
CPC . F21K 9/61; F21K 9/233; F21K 9/237; F21K 9/232; G02B 6/00
See application file for complete search history.

(56) References Cited

U.S. PATENT DOCUMENTS

| | | | |
|---|---|---|---|
| 8,154,181 B1* | 4/2012 | Lin | F21V 29/767 313/46 |
| 8,415,865 B2* | 4/2013 | Liang | G02B 6/0006 313/46 |
| 2012/0140517 A1* | 6/2012 | Sakamoto | G02B 6/0036 362/607 |
| 2012/0267997 A1 | 10/2012 | Kijima et al. | |
| 2013/0044497 A1* | 2/2013 | Sakamoto | G02B 6/0008 362/311.04 |
| 2013/0335995 A1* | 12/2013 | Te-Kai | G02B 6/0096 362/555 |
| 2014/0043852 A1 | 2/2014 | Zeng | |
| 2016/0041324 A1* | 2/2016 | Nava | G02B 6/0001 362/311.01 |

FOREIGN PATENT DOCUMENTS

| | | |
|---|---|---|
| CN | 102661575 A | 9/2012 |
| CN | 202835196 U | 3/2013 |

* cited by examiner

*Primary Examiner* — Elmito Breval
(74) *Attorney, Agent, or Firm* — Schmeiser, Olsen & Watts, LLP

(57) ABSTRACT

An LED lamp with an LED lamp light guide of ultra-high brightness and large angle, including a lamp holder, a lampshade, an LED light source, and the light guide is provided. The lamp holder is fastened with the lampshade, the LED light source is arranged in the lamp holder and connected to a power source through the lamp holder, the light guide is arranged inside the lamp holder and the lampshade, and the light guide is a long bar with four wing plates perpendicularly connected to each other in a cross shape when viewed longitudinally.

8 Claims, 10 Drawing Sheets

LIGHT GUIDE AND LED LAMP WITH THE LIGHT GUIDE

CROSS REFERENCE TO RELATED APPLICATION

This application claims priority to Chinese Application No. 201520588274.7 having a filing date of Aug. 6, 2015, the entire contents of which are hereby incorporated by reference.

FIELD OF TECHNOLOGY

The following relates to a field of a lamp-light device, in particular to a light guide and an LED lamp with the light guide.

BACKGROUND

The light guide is a device designed to transmit light from a light source to a point at some distance with minimal loss. Light is transmitted through light guide by means of total internal reflection. Generally, the light guide is made of optical grade materials, for example, acrylic resin, polycarbonate, epoxies, and glass. The light guide can be used for transmitting the light of an LED on a PCB to a front panel for use as status indication, can be used for collecting and directing the light to backlight an LCD display or, and can be used as the means for illuminating a pattern on a see through window. Limited by the production cost, a light guide is usually made of optical grade materials, for example, acrylic resin, polycarbonate, epoxies, and glass. The effect of light transmission of the light guide made of the above materials is not ideal. The light guide made of glass is not resistant to vibration and is prone to breakage.

SUMMARY

An aspect relates to an LED lamp with an LED lamp light guide of ultra-high brightness and large angle. The LED lamp comprises a lamp holder, a lampshade, an LED light source, and the light guide. The lamp holder is fastened with the lampshade, the LED light source is arranged in the lamp holder and connected to a power source through the lamp holder, the light guide is arranged inside the lamp holder and the lampshade, and the light guide is a long bar with four wing plates perpendicularly connected to each other in a cross shape when viewed longitudinally. Four supporting feet are arranged at one end of the light guide and are in clamping connection with the LED light source, and the surface, supported by the four supporting feet, of the light guide is the light incident surface of the light guide; cross grains are arranged on the side surface extending from the other end of the light guide to the middles of the four wing plates, on the edges of two plate surfaces of each wing plate are provided two grooves corresponding to each other, the multiple grooves, are communicated with each other at the end of the light guide provided with the cross grains, and the multiple cross grains and the multiple grooves jointly form the light-emitting end of the light guide.

Specifically, the light guide comprises two light guide plates in long-strip shape, the two light guide plates are meshed with each other so as to form a long-strip bar with four wing plates connected to each other in a cross shape; or the light guide is in an integral long-strip bar in cross shape.

Furthermore, two grooves on different plate surfaces of the same wing plate coincide with each other while separated by the wing plate, and are not communicated with each other.

Specifically, the two light guide plates in long-strip shape are acrylic plates or transparent plates made of other plastic materials.

Specifically, the axial directions of the multiple cross grains are the same as the thickness directions of the wing plates where the cross grains are located.

Specifically, the lamp holder is formed by one-time injection molding or by assembly.

As another technical solution, embodiments of the present invention provide a light guide in long-strip shape with four wing plates perpendicularly connected to each other in a cross shape when viewed longitudinally. Four supporting feet are arranged at one end of the light guide, and the surface of the light guide, supported by the four supporting feet, is the light incident surface of the light guide; cross grains are arranged on the side surface extending from the other end of the light guide to the middles of the four wing plates. On the edges of two plate surfaces of each wing plate are provided two grooves corresponding to each other. The multiple grooves are communicated with each other at the position where the two light guide plate meshes with each other. The multiple grooves are communicated with each other at the end of the light guide provided with the cross grains. The multiple cross grains and the multiple grooves jointly form the light-emitting end of the light guide.

Furthermore, the light guide comprises two light guide plates in long-strip shape, the two light guide plates are meshed with each other so as to form a long-strip bar with four wing plates connected to each other in a cross shape; or the light guide is in an integral long-strip bar in cross shape.

As a preferable solution, the two long-strip-shaped light guide plates are the first light guide plate and the second light guide plate, which are provided with inward recesses respectively and are in clamping connection through the inward recesses so as to form the four wing plates; the first light guide plate is provided with a light ray emitting end and a light ray incident end. The light ray emitting end of the first light guide plate is an arc, and the U-shaped grooves are formed along the light ray emitting end respectively on the two plate surfaces of the first light guide plate; the second light guide plate is provided with a light ray emitting end and a light ray incident end, the light ray emitting end of the second light guide plate is in a tuning fork shape, and C-shaped grooves are formed along the outer side edges of the two fork arms on the two plate surfaces of the second light guide plate respectively.

As another preferable solution, the two long-strip-shaped light guide plates comprise the third light guide plate and the fourth light guide plate which are provided with the inward recesses respectively and are in clamping connection through the inward recesses so as to form the four wing plates; the third light guide plate is provided with a light ray emitting end and a light ray incident end, the light ray emitting end of the third light guide plate is in a shape similar to a rhombus, and V-shaped grooves are formed along the two sides of the light ray emitting end respectively in the two plate surfaces of the third light guide plate; the fourth light guide plate is provided with a light ray emitting end and a light ray incident end, the light ray emitting end of the forth light guide plate is in a tuning fork shape, the fork arms are in shapes similar to obtuse triangles, and V-shaped grooves are formed along the outer side edges of the two fork arms on the two plate surfaces of the fourth light guide plate respectively.

Compared with the related art, the LED lamp with the light guide has the following advantages: 1. The light-emitting end is jointly formed by the grooves in the light guide and the cross grains on the light guide, and light is refracted to four directions by the grooves in the cross shaped four wing plates and the cross grains on the four wing plates, with each direction having grooves in two wing plates and the cross grains on one wing plate to emit light. This enables 360-degree light transferring, and the simulation of the effects of a traditional tungsten lamp or other light-emitting modeling, so that the light-emitting angle of the LED lamp of ultra-brightness is large and close to 360 degrees, which is much larger than that of a traditional LED lamp; the LED lamp with the light guide saves more energy and is more friendly to the environment and higher in efficiency; 2. The LED lamp with the light guide is simple in manufacturing process, attractive in appearance, elegant, and high in efficiency, and will not bring difficulty to assembling and volume production; 3. The lamp holder is formed by one-time injection molding, and is more resistant to water, dust, and impact.

The utility model is further explained as follows with combination of the drawings and embodiment.

BRIEF DESCRIPTION OF THE DRAWINGS

Some of the embodiments will be described in detail, with reference to the following figures, wherein like designations denote like members, wherein.

DETAILED DESCRIPTION OF THE EMBODIMENT

Embodiment 1

As a preferable solution, a light guide in embodiment 1 is a combined I-type light guide 11, comprising a first light guide plate 112 and a second light-transferring 114.

Figure 1:
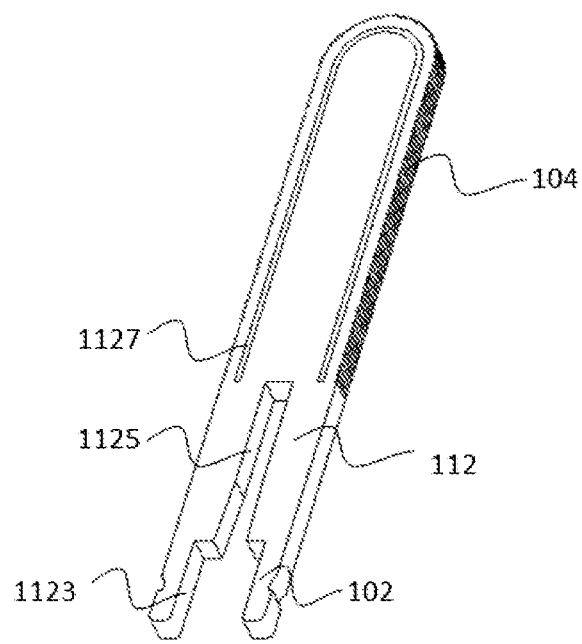
FIG. 1 is a structure diagram of the first light guide plate.
Figure 2:
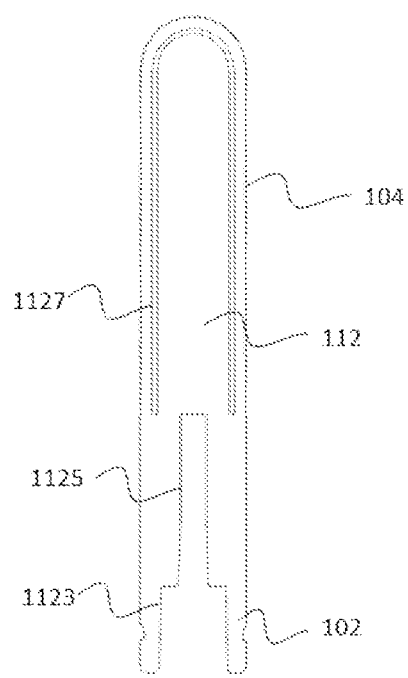
FIG. 2 is a front view of the first light guide plate.

Specifically, referring to FIG. 1 and FIG. 2, the first light guide plate 112 is a long-strip-shaped acrylic plate, one end of light guide plate which is an arc and serves as the light ray emitting end of the first light guide plate 112; its opposite end of the first light guide plate 112 recesses inwards to form two supporting feet 102, serves as the light ray incident end of the first light guide plate 112. In addition, the recess is a step narrowing-type inward recess which extends from the light ray incident end to the light ray emitting end, and is provided with a first recess 1123 and a second recess 1125 from the light ray incident end, wherein the side surface of the first recess 1123 connected with the second recess 1125 is the light ray incident surface of the first light guide plate 112. The two plate surfaces of the first light guide plate 112 are each provided with a groove recessing inwards in the thickness direction of the first light guide plate 112. Each groove starts from the edge of the left side in the middle of the corresponding plate surface, extends along the left side, passes by the edge of the light ray emitting end of the first light guide plate 112, then extends along the right side of the corresponding plate surface, and stops on the edge of the right side in the middle of the corresponding plate surface. The grooves appear to be U shapes and thus called U-shaped grooves 1127. The two U-shaped grooves 1127 in the same first light guide plate 112 coincide with each other and are separated by the first light guide plate 112, but are not communicated with each other. A plurality of cross grains 104 are arranged on the side edge of the first light guide plate 112 where the surrounding U-shaped grooves 1127 extend along, and the axial direction of each cross grain 104 is the same as the thickness direction of the first light guide plate 112.

It should be noted that 'the left side in the middle of the plate surface' and 'the right side in the middle of the plate surface' are used for distinguishing explanation. It is known to those skilled in the art that the function of light guide is not influenced no matter the U-shaped grooves 1127 start from the left side or the right side. Therefore, the feature explanation of 'the right side in the middle of the plate surface' and 'the right side in the middle of the plate surface' cannot be used for limiting the technical contents.

Figure 3:
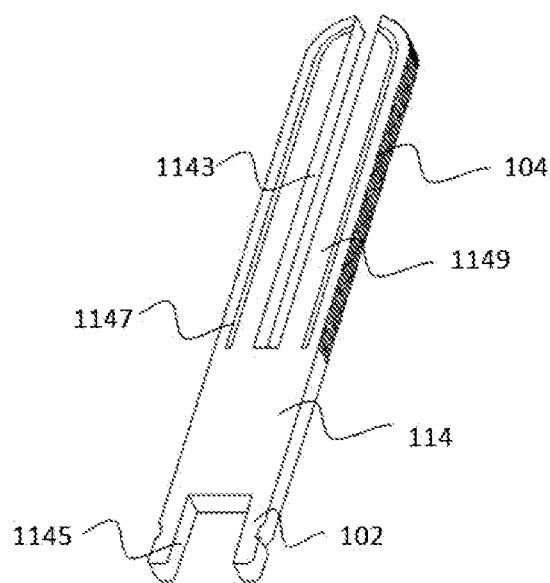
FIG. 3 is a structure diagram of the second light guide plate.
Figure 4:
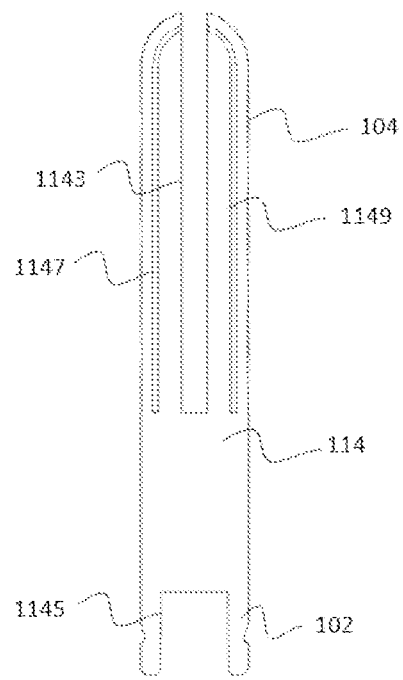
FIG. 4 is a front view of the second light guide plate.

Referring to FIG. 3 and FIG. 4, a second light guide plate 114 is a long-strip-shaped acrylic plate or a transparent plate made of other plastic materials, light guide plate with its shape similar to that of the first light guide plate 112, light guide plate which comprises a light ray emitting end of the second light guide plate 114, a light ray incident end of the second light guide plate 114, grooves in plate surfaces, and cross grains 104 on the side surface. It is different to the first light guide in that: (1) the second light guide plate 114 is not provided with a second recess 1125, the structure of the recess of the light ray incident end of the second light guide plate 114 is the same as that of the first recess 1123 of the first light guide plate 112, namely the inward recessing part is called a fourth recess 1145 of the second light guide plate 114. The second light guide plate 114 is also provided with two supporting feet 102. The side surfaces of the fourth recess 1145 not involved in forming the connection of the two supporting feet 102 are the light ray incident surfaces of the second light guide plate 114; (2) on the basis that the light ray emitting end of the second light guide plate 114 is an arc, the middle of the arc recesses inwards to the light ray incident end of the second light guide plate 114 to form a third recess 1143, therefore, the light ray emitting end of the second light guide plate 114 is in a tuning fork shape, on which two first fork arms 1149 are formed light guide plate; (3) the U-shaped grooves 1127 in the two plate surfaces of the second light guide plate 114 are intercepted by the third recess 1143 light guide plate, thus two C-shaped grooves 1147 are formed in each of the two first fork arms 1149 of the second light guide plate 114, and the two C-shaped grooves 1147 located on different plate surfaces of the same first fork arm 1149 coincide with each other, but are not communicated as separated by the second light guide plate 114.

Figure 5:
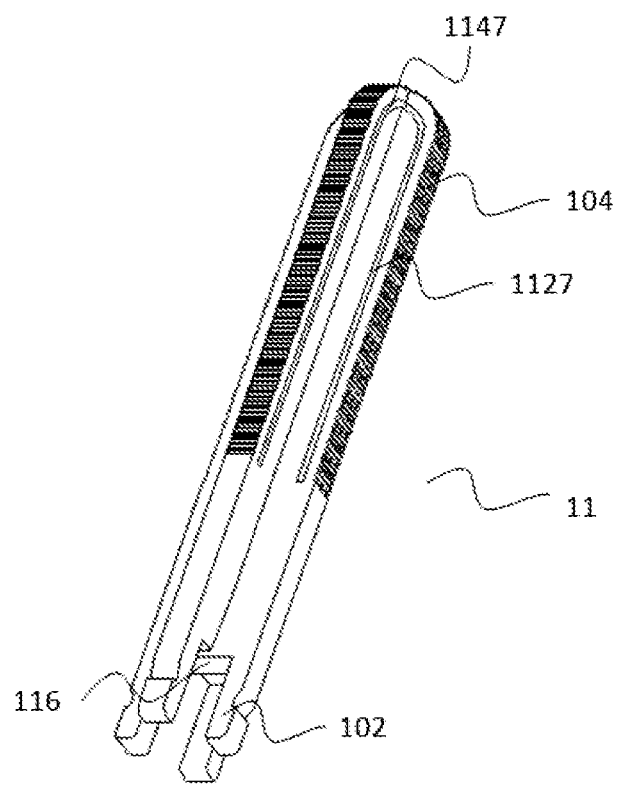
FIG. 5 is a structure diagram of the combined I-type light guide.
Figure 6:
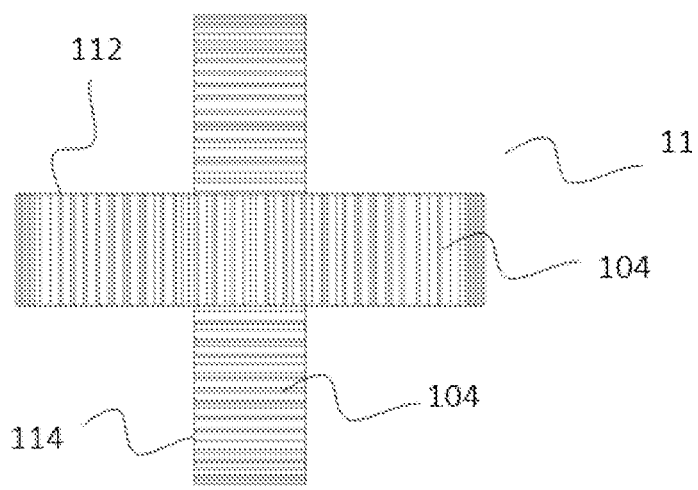
FIG. 6 is a diagram showing the light emitting end of the combined I-type light guide.
Figure 7:
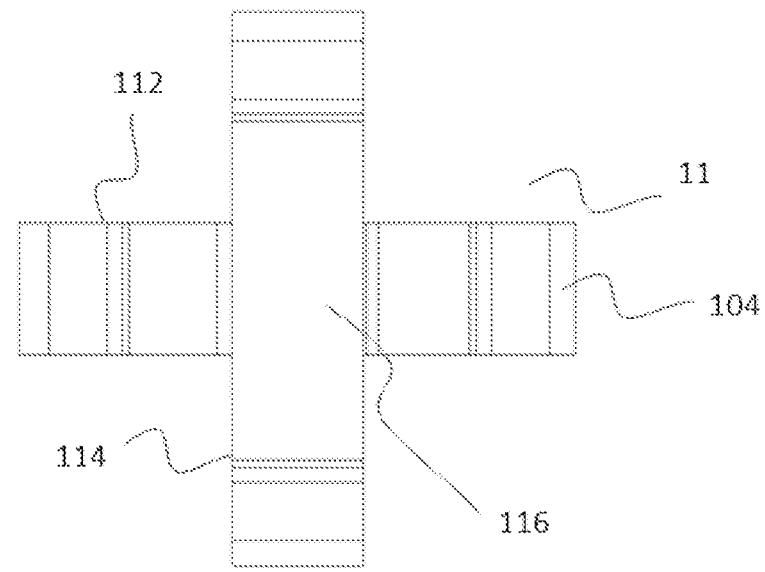
FIG. 7 is a diagram showing the light ray incident surface of the combined I-type light guide.

The combined I-type light guide 11 is shown in FIG. 5-FIG. 7. The second recess 1125 of the first light guide plate 112 is meshed with the third recess 1143 of the second light guide plate 114, so that the light guide plate 112 and the second light guide plate 114 are spliced with each other in a perpendicular mode to form a long bar with four wing plates arranged in a cross shape. The wing plates are the half plates of the first light guide plate 112 and the half plates of the second light guide plate 114. The light ray emitting end of the first light guide plate 112 is combined with the light ray emitting end of the second light guide plate 114, and the light ray incident end of the first light guide plate 112 is combined with the light ray incident end of the second light guide plate 114. In addition, the U-shaped grooves 1127 on the first light guide plate 112 and the C-shaped grooves 1147 on the second light guide plate 112 are correspondingly communicated at the mutually meshing position; the cross grains 104 on the first light guide plate 112 and the cross grains 104 on the second light guide plate 114 are connected into a whole at the mutually meshing positions. Wherein, the light ray emitting end of the first light guide plate 112, the light ray emitting end of the second light guide plate 114, the two U-shaped grooves 1127 of the first light guide plate 112, and the four C-shaped grooves 1147 of the second light guide plate 114 jointly form the light-emitting end of the combined I-type light guide 11. Besides, the light ray incident surfaces of the first light guide plate 112 and the light ray incident surfaces of the second light guide plate 114 jointly form the light ray incident surface 116 of the combined I-type light guide. The two supporting feet 102 of the first light guide plate 112 and the two supporting feet 102 of the second light guide plate 114 jointly support the light ray incident surface 116 of the combined I-type light guide, and a containing cavity for an LED light source 40 of the combined I-type light guide 11 is formed by jointly enclosing the two supporting feet 102 of the first light guide plate 112 and the two supporting feet 102 of the second light guide plate 114.

Figure 8:
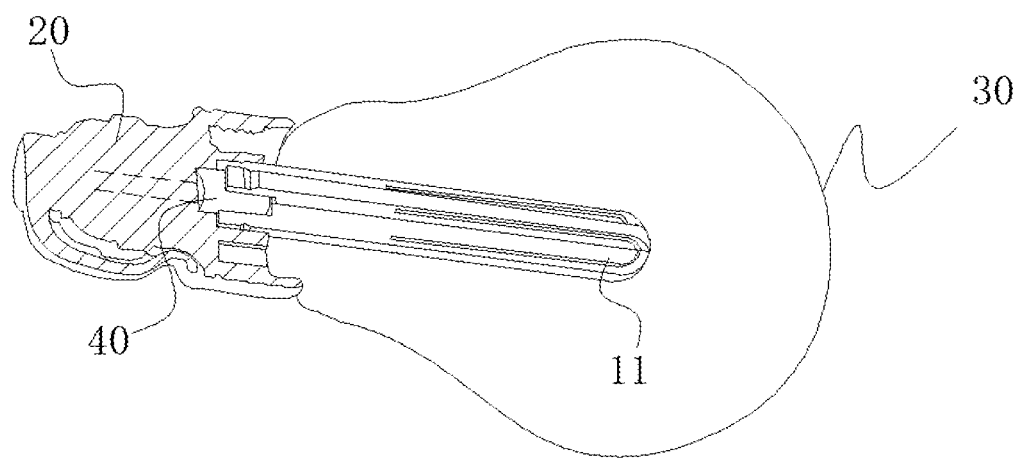
FIG. 8 is a structure diagram of an LED lamp with a light guide in embodiment 1.

Referring to FIG. 8, an LED lamp with light guide of the embodiment 1, comprising a lamp holder 20, a lampshade 30, an LED light source 40 and the combined I-type light guide 11, and the lamp holder 20 is fastened with the lampshade 30. The LED light source 40 is arranged in the lamp holder 20 and is connected to a power source through the lamp holder 20. The combined I-type light guide 11 is arranged inside the lamp holder 20 and the lampshade 30. Specifically, the four supporting feet 102 of the combined I-type light guide 11 is in clamping connection with the LED light source 40, and the remaining part of the combined I-type light guide 11 is arranged in the lampshade 30.

Embodiment 2

Figure 9:
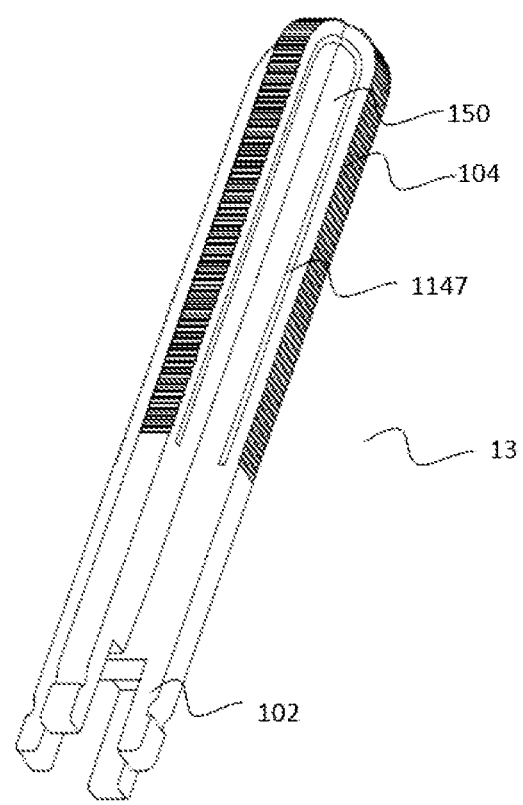
FIG. 9 is a diagram of the integral I-type light guide.

Referring to FIG. 9, as a preferable solution, the light guide of embodiment 2 has the same shape as the light guide of embodiment 1. The difference is that the light guide of embodiment 2 is an integrated I-type light guide 13 which is not divided into a first light guide plate 112 and a second light guide plate 114 separately, but is integrally formed into a long bar in cross shape when viewed longitudinally. In other words, the light guide is provided with four wing plates 150 perpendicular to each other, replacing the first light guide plate 112 and the second light guide plate 114 which are in the clamping connection in embodiment 1. To those skilled in the art, the integrated I-type light guide 13 is easy to obtain in view t of embodiment 1, and therefore the combined I-type light guide 11 of embodiment 1 and the integrated I-type light guide 13 of embodiment 2 are technical solutions under the same concept. In addition, the structure of an LED lamp provided with the light guide of embodiment 2 is similar to that of the LED lamp provided with the light guide of embodiment 1. The only difference is that the light guide of embodiment 2 is the integrated I-type light guide 13. Whether the light guide is combined or integrated does not affect the technical effect of the LED lamp.

Embodiment 3

As a preferable solution, the light guide of embodiment 3 is a combined II-type light guide 12 comprising a third light guide plate 123 and a fourth light guide plate 125.

Figure 10:
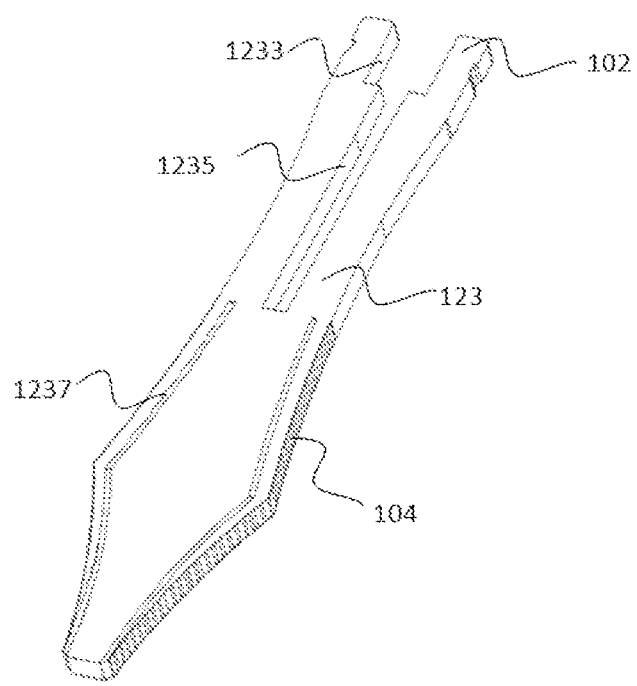
FIG. 10 is a structure diagram of the third light guide plate.
Figure 11:
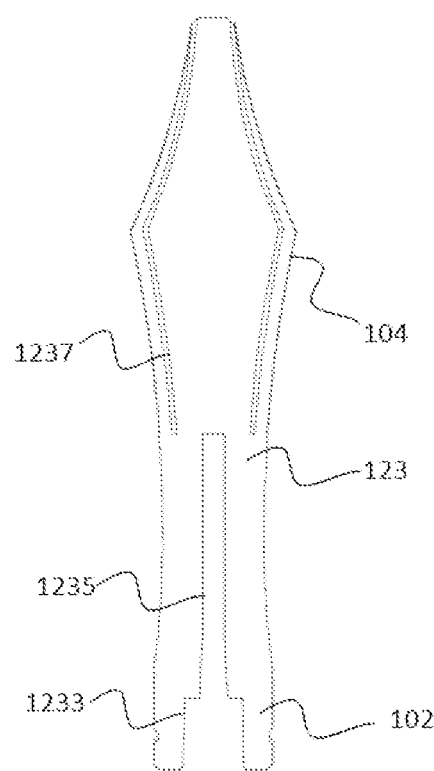
FIG. 11 is a front view of the third light guide plate.

Specifically, referring to FIG. 10 and FIG. 11, the third light guide plate 123 is a long-strip-shaped acrylic plate or a transparent plate made of other plastic materials, one end of the third light guide plate is similar to a rhombus and serves as the light ray emitting end of the third light guide plate 123; its opposite end of the third light guide plate 123 recesses inwards to form two supporting feet 102, and serve as the light ray incident end of the third light guide plate 123. In addition, the recess is in a step narrowing-type inward recess which extends from the light ray incident end to the light ray emitting end, and is provided with a fifth recess 1233 and a sixth recess 1235 from the light ray incident end. Wherein, the side surfaces of the fifth recess 1233 connected with the sixth recess 1235 are the light ray incident surfaces of the third light guide plate 123.

The light ray emitting end of the third light guide plate 123 is similar to a rhombus. Specifically, the width of the plate first increases and then decreases in a direction from the middle of the third light guide plate 123 to the light ray emitting end, so that a sharp corner is formed in each of the two sides of the third light guide plate 123, and the end portion of the light ray emitting end forms a narrow and small plane.

Two grooves recessing inwards in the thickness direction of the third light guide plate 123 are formed in each of two plate surfaces of the third light guide plate 123. One of the grooves starts from the edge of one side in the middle of the corresponding plate surface, extends along that side, and stops at the light ray emitting end of the third light guide plate 123. The grooves are in V shapes and therefore called V-shaped grooves 1237. The other V-shaped groove 1237 in the same plate surface is on the other side correspondingly, and the two remaining V-shaped grooves 1237 are formed in the other plate surface of the third light guide plate 123. The V-shaped grooves 1237 in the two plate surfaces of the third light guide plate 123 coincide with each other, but are not communicated with each other as separated by the third light guide plate 123. A plurality of cross grains 104 are arranged on the side edge of the third light guide plate 123 where the surrounding V-shaped grooves 1237 extend along, and the axial direction of each cross grain 104 is the same as the thickness direction of the third light guide plate 123.

Figure 12:
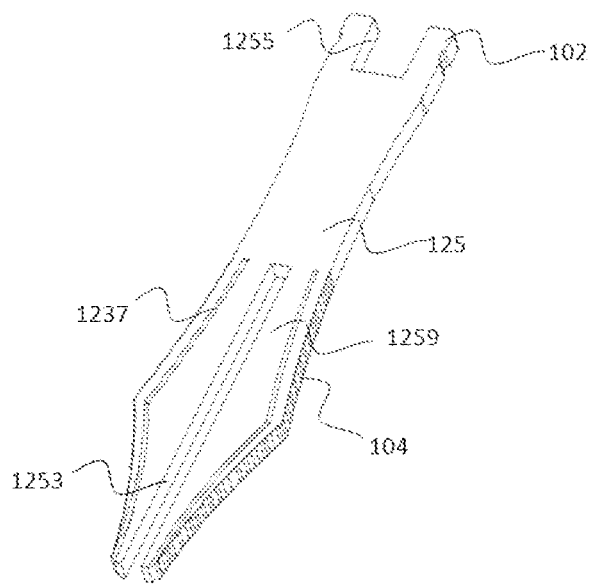
FIG. 12 is a structure diagram of the forth light guide plate.
Figure 13:
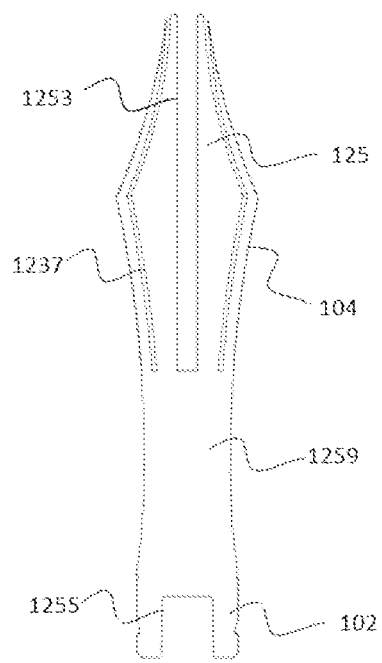
FIG. 13 is a front view of the forth light guide plate.

Referring to FIG. 12 and FIG. 13, the fourth light guide plate 125 is a long-strip-shaped acrylic plate, with its shape similar to that of the third light guide plate 123 in shape, which comprises the light ray emitting end of the fourth light guide plate 125, the light ray incident end of the fourth light guide plate 125, grooves on the plate surfaces, and the cross grains 104 on the side surface. It is deferent from the third light guide plate 123 in that (1) the fourth light guide plate 125 is not provided with a sixth recess 1235, and the structure of the inward recess part of the light ray incident end of the fourth light guide plate 125 is the same as that of the fifth inner notch position 1233 of the third light guide plate 123, in other words, the inward recess part is called the eighth recess 1255 of the fourth light guide plate 125. The fourth light guide plate 125 is also provided with two supporting feet 102, and the side surfaces, not involved in forming connection of the two supporting feet 102, of the fourth recess 1145 are the light ray incident surfaces of the fourth light guide plate 125; (2) on the basis that the light ray emitting end of the fourth light guide plate is similar to a rhombus, the middle position of the shape similar to a rhombus recesses inwards to the light ray incident end of the fourth light guide plate 125 to form a seventh recess 1253, therefore the light ray emitting end of the fourth light guide plate 125 is in a tuning fork shape, on which two second fork arms 1259 are formed; the middle of each second fork arm 1259 is provided with an outward sharp corner, and each second fork arm 1259 is in a shape similar to an obtuse triangle; (3) the seventh recess 1253 on the fourth light guide plate 125 enables the light ray emitting end of the fourth light guide plate 125 to appear to be two sharp ends.

Figure 14:
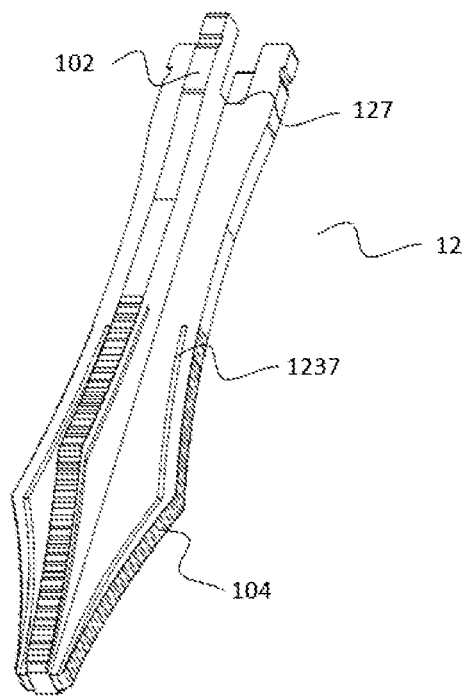
FIG. 14 is a structure diagram of the combined II-type light guide.
Figure 15:
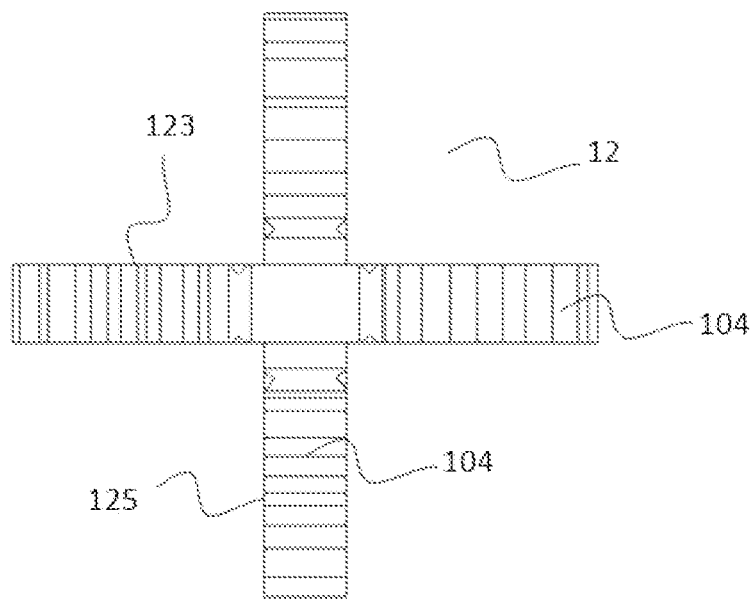
FIG. 15 is a diagram showing the light emitting end of the combined II-type light guide.
Figure 16:
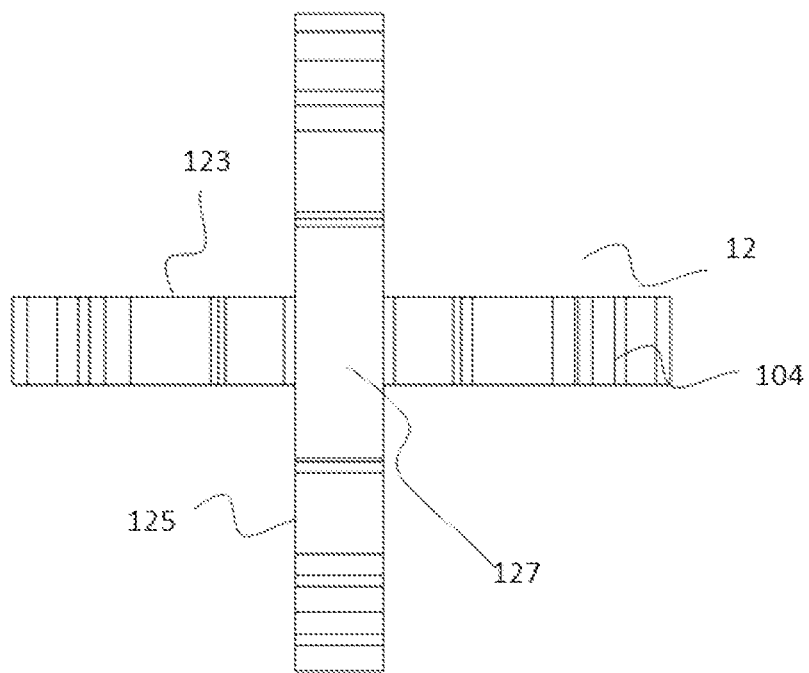
FIG. 16 is a diagram showing the light ray incident surface of the combined II-type light guide

The combined II-type light guide 12 is shown in FIG. 14-FIG. 16. The sixth inner notch position 1235 of the third light guide plate 123 is meshed with the seventh inner recessing position 1253 of the fourth light guide plate 125, so that the third light guide plate 123 and the fourth light guide plate 125 are spliced in a perpendicular modes to form a long bar with four wing plates arranged in a cross shape, and the wing plates are the half plates of the third light guide plate 123 and the fourth light guide plate 125. The light ray emitting end of the third light guide plate 123 is combined with the light ray emitting end of the fourth light guide plate 125, and the light ray incident end of the third light guide plate 123 is combined with the light ray incident end of the fourth light guide plate 125. Besides, the V-shaped grooves 1237 of the third light guide plate 123 and the V-shaped grooves 1237 of the fourth light guide plate 125 are correspondingly communicated at the mutually meshing position; the cross grains 104 of the third light guide plate 123 and the cross grains 104 of the fourth light guide plate 125 are connected into a whole at the mutually meshing position. The light ray emitting end of the third light guide plate 123, the light ray emitting end of the fourth light guide plate 125, the V-shaped grooves 1237 of the third light guide plate 123, and the V-shaped grooves 1237 of the fourth light guide plate 125 jointly form the light-emitting end of the combined II-type light guide 12. In addition, the light ray incident surfaces of the third light guide plate 123 and the light ray incident surfaces of the fourth light guide plate 125 jointly form the light ray incident surface 127 of the combined II-type light guide, the two supporting feet 102 of the third light guide plate 123 and the two supporting feet 102 of the fourth light guide plate 125 jointly support the light ray incident surface 127 of the combined II-type light guide, and a containing cavity of an LED light source 40 of the combined II-type light guide 12 is formed by jointly enclosing the two supporting feet 102 of the third light guide plate 123 and the two supporting feet 102 of the fourth light guide plate 125.

Figure 17:
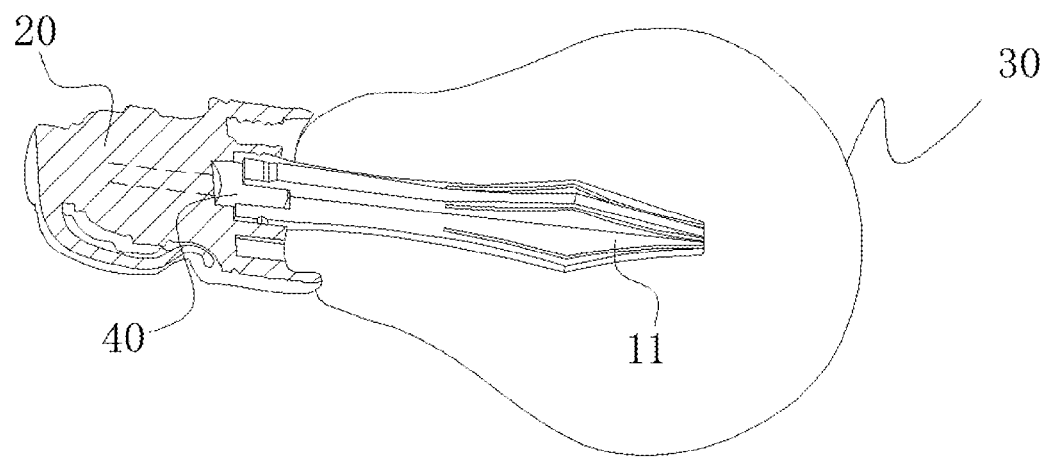
FIG. 17 is a structure diagram of an LED lamp with a light guide in embodiment 2.

Referring to FIG. 17, an LED lamp with light guide of embodiment 3 comprising a lamp holder 20, a lampshade 30, the LED light source 40 and the combined II-type light guide 12, and the lamp holder 20 is fastened with the lampshade 30. The LED light source 40 is arranged in the lamp holder 20 and communicated to a power source through the lamp holder 20. The combined II-type light guide 12 is arranged in the lamp holder 20 and the lampshade 30. Specifically, the four supporting feet 102 of the combined II-type light guide 12 is in clamping connection with the LED light source 40, and the remaining part of the combined II-type light guide 12 is arranged in the lampshade 30.

Embodiment 4

Figure 18:
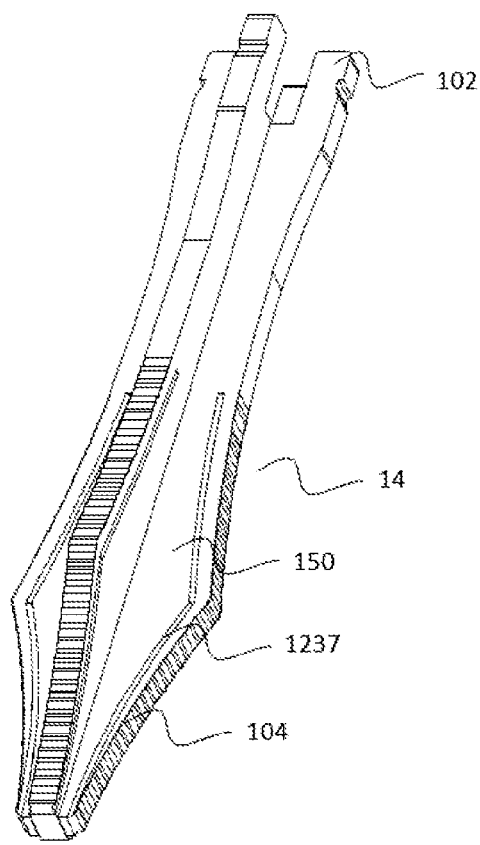
FIG. 18 is a diagram of the integral II-type light guide.

Referring to FIG. 18, as a preferable solution, a light guide of embodiment 4 has the same shape as the light guide of embodiment 2. The difference is that the light guide of embodiment 4 is an integrated II-type light guide 14 which is not divided into a third light guide plate 123 and a fourth light guide plate 125 separately, but is integrally formed into a long bar in cross shape when viewed longitudinally. In other words, the light guide is provided with four wing plates 150 perpendicular to each other, replacing the third light guide plate 123 and the fourth light guide 125 which are in the clamping connection in embodiment 3. To those skilled in the art, the integrated II-type light guide 14 is easy to obtain under the enlightenment of embodiment 3, and therefore the combined II-type light guide 12 of embodiment 3 and the integrated II-type light guide 14 of embodiment 4 are technical solutions under the same concept. In addition, the structure of an LED lamp provided with the light guide of embodiment 4 is similar to that of the LED lamp provided with the light guide of embodiment 3. The only difference is that the light guide of embodiment 4 is the integrated II-type light guide 14. Whether the light guide is combined or integrated does not affect the technical effect of the LED lamp.

Preferably, the lamp holder 20 is formed by one-time injection molding or assembled by the injection-molded parts, which is more resistant to water, dust, and impact.

Specifically, the specifications of the lamp holder 20 are T50, T11 and A19 and can be changed as required.

Furthermore, the LED light source 40 is an ultra bright LED, and alternating current or direct current is used as the power source.

Compared with the prior art, the light-emitting end of the light guide of the LED lamp is jointly formed by the grooves in the light guide and the cross grains on the light guide, light is refracted by the grooves in the four wing plates in the cross long-strip shape and the cross grains on the four wing plates in the cross long-strip shape in four directions respectively, the grooves in two wing plates and the cross grains on one wing plate emit light in each direction, 360-degree light transferring is achieved, and the effects of a traditional tungsten lamp or other light-emitting modeling are simulated, so that the light-emitting angle of the LED lamp with super brightness is large, close to 360 degrees, and much larger than that of a traditional LED lamp; furthermore, the LED lamp with the light guide saves more energy and is more friendly to the environment and higher in efficiency; In addition, the LED lamp with the light guide is simple in manufacturing process, attractive in appearance, elegant, and high in efficiency of the light guide, and cannot bring difficulty to assembling and volume production; moreover, the lamp holder is formed by one-time injection molding or assembling the injection-molded parts, and is more resistant to water, dust and crash.

The utility model is not limited to the implementation modes. If any changes or variations do not depart from the spirit and scope of the utility model, and belong to the claims and the equivalent technical scope of the utility model, the utility model also intends to include the changes and variations.

What is claimed is:

1. An LED lamp with light guide, comprising:
a lamp holder, a lampshade, an LED light source, and a light guide, wherein the lamp holder is fastened with the lampshade, the LED light source is arranged in the lamp holder and connected to a power source through the lamp holder;

wherein the light guide is arranged inside the lamp holder and the lampshade, and the light guide is a long-strip bar with four wing plates perpendicularly connected to each other in a cross shape when viewed longitudinally;

wherein four supporting feet are arranged at one end of the light guide and are in clamping connection with the LED light source, and a surface, supported by the four supporting feet, of the light guide is a light incident surface of the light guide;

wherein cross grains are arranged on a side surface extending from an other end of the light guide to middles of the four wing plates, axial directions of the cross grains are the same as thickness directions of the four wing plates where the cross grains are located;

wherein on edges of two plate surfaces of each wing plate are provided two grooves corresponding to each other and the two grooves are communicated with each other at an end of the light guide provided with the cross grains;

wherein the cross grains and the two grooves jointly form the light-emitting end of the light guide, further wherein light is refracted by the two grooves in the four wing plates in the cross long-strip shape and the cross grains on the four wing plates in the cross long-strip shape in four directions respectively.

2. The LED lamp with light guide of claim 1, wherein the light guide comprises two light guide plates in long-strip shape, the two light guide plates are meshed with each other so as to form a long-strip bar with four wing plates connected to each other in a cross shape, or the light guide is in an integral long-strip bar in cross shape.

3. The LED lamp with light guide of claim 1, wherein the two grooves on different plate surfaces of the same wing plate coincide with each other while separated by the wing plate, and are not communicated with each other.

4. The LED lamp with light guide of claim 1, wherein the lamp holder is formed by one-time injection molding or by assembly.

5. A light guide, wherein the light guide is in long-strip shape with four wing plates perpendicularly connected to each other in a cross shape when viewed longitudinally; wherein four supporting feet are arranged at one end of light guide, and a surface of the light guide, supported by the four supporting feet, is a light incident surface of the light guide; wherein cross grains are arranged on a side surface extending from an other end of the light guide to middles of the four wing plates, the axial directions of the cross grains are the same as thickness directions of the four wing plates where the cross grains are located; wherein on edges of two plate surfaces of each wing plate are provided two grooves corresponding to each other; wherein the two grooves are communicated with each other at a position where the two light guide plate meshes with each other; wherein the two grooves are communicated with each other at an end of the light guide provided with the cross grains; wherein the cross grains and the two grooves jointly form the light-emitting end of the light guide, wherein light is refracted by the two grooves in the four wing plates in the cross long-strip shape and the cross grains on the four wing plates in the cross long-strip shape in four directions respectively.

6. The light guide of claim 5, wherein the light guide comprises two light guide plates in long-strip shape, the two light guide plates are meshed with each other so as to form a long-strip bar with four wing plates connected to each other in a cross shape; or the light guide is in an integral long-strip bar in cross shape.

7. The light guide of claim 6, wherein the two long-strip-shaped light guide plates are the first light guide plate and the second light guide plate, which are provided with inward recesses respectively and are in clamping connection through the inward recesses so as to form the four wing plates; the first light guide plate is provided with a light ray emitting end and a light ray incident end wherein the light ray emitting end of the first light guide plate is an arc, and the U-shaped grooves are formed along the light ray emitting end respectively on the two plate surfaces of the first light guide plate ; the second light guide plate is provided with a light ray emitting end and a light ray incident end, the light ray emitting end of the second light guide plate is in a tuning fork shape, and C-shaped grooves are formed along the outer side edges of the two fork arms on the two plate surfaces of the second light guide plate respectively.

8. The light guide of claim 6, wherein the two long-strip-shaped light guide plates comprise the third light guide plate and the fourth light guide plate which are provided with the inward recesses respectively and are in clamping connection through the inward recesses so as to form the four wing plates; the third light guide plate is provided with a light ray emitting end and a light ray incident end, the light ray emitting end of the third light guide plate is in a shape similar to a rhombus, and V-shaped grooves are formed along the two sides of the light ray emitting end respectively in the two plate surfaces of the third light guide plate; the fourth light guide plate is provided with a light ray emitting end and a light ray incident end, the light ray emitting end of the forth light guide plate is in a tuning fork shape, the fork arms are in shapes similar to obtuse triangles, and V-shaped grooves are formed along the outer side edges of the two fork arms on the two plate surfaces of the fourth light guide plate respectively.

* * * * *